(12) United States Patent
Yao

(10) Patent No.: US 11,526,926 B2
(45) Date of Patent: Dec. 13, 2022

(54) SERVICE DATA PROCESSING METHOD AND DEVICE

(71) Applicant: Alibaba Group Holding Limited, Grand Cayman (KY)

(72) Inventor: Xinxin Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 243 days.

(21) Appl. No.: 16/432,725

(22) Filed: Jun. 5, 2019

(65) Prior Publication Data

US 2019/0287156 A1 Sep. 19, 2019

Related U.S. Application Data

(63) Continuation of application No. PCT/CN2017/113014, filed on Nov. 27, 2017.

(30) Foreign Application Priority Data

Dec. 6, 2016 (CN) .......................... 201611109180.2

(51) Int. Cl.
*G06Q 30/06* (2012.01)
*G06Q 30/02* (2012.01)

(52) U.S. Cl.
CPC ......... *G06Q 30/0633* (2013.01); *G06Q 30/02* (2013.01); *G06Q 30/06* (2013.01)

(58) Field of Classification Search
CPC ..... G06Q 30/0633; G06Q 30/02; G06Q 30/06
(Continued)

(56) References Cited

U.S. PATENT DOCUMENTS 6,601,037 B1 7/2003 Kolls
6,615,183 B1 9/2003 Kolls
(Continued)

FOREIGN PATENT DOCUMENTS

CN 103458010 A 12/2013
CN 104601644 A 5/2015
(Continued)

OTHER PUBLICATIONS

Anon., "Chanjet Technology Co Ltd Files Chinese Patent Application for Information Push System and Information Push Method," Information Technology Patent News [New Delhi] Oct. 1, 2013. (Year: 2013).*

(Continued)

*Primary Examiner* — Nicholas D Rosen
(74) *Attorney, Agent, or Firm* — Lee & Hayes, P.C.

(57) ABSTRACT

An information server determines, after receiving a service request from a user and based on first record information about the user registered with the information server, second record information about the user registered with a service apparatus providing selected service data information, which implements one-way communication of the record information about the user registered with the service apparatus to the information server. A subsequent information server may process service data by directly using the determined second record information about the user and the selected service data information. On the basis of ensuring that the user enjoys member benefits provided by the service apparatus, and without requiring the user to log into the information server and perform searching again, the number of times of interaction of the user with the server is reduced, and the user operation is simplified.

19 Claims, 8 Drawing Sheets

(58) Field of Classification Search
USPC .................................................. 705/26.8
See application file for complete search history.

(56) References Cited

U.S. PATENT DOCUMENTS

| | | | |
|---|---|---|---|
| 7,140,036 B2* | 11/2006 | Bhagavatula | H04L 63/08 726/4 |
| 7,340,433 B1 | 3/2008 | Kay et al. | |
| 8,738,418 B2 | 5/2014 | Winters | |
| 9,460,440 B2 | 10/2016 | Antao et al. | |
| 10,389,726 B2* | 8/2019 | Chen | G06Q 20/3223 |
| 10,390,396 B1* | 8/2019 | Hsia | H05B 45/375 |
| 10,404,830 B2* | 9/2019 | Zhang | H04L 67/306 |
| 10,789,578 B2* | 9/2020 | Kitano | G07F 17/3251 |
| 10,902,382 B2* | 1/2021 | Callahan | G16H 40/67 |
| 2001/0037451 A1* | 11/2001 | Bhagavatula | G06F 21/31 713/155 |
| 2002/0032655 A1 | 3/2002 | Antonin et al. | |
| 2002/0103660 A1 | 8/2002 | Cramon et al. | |
| 2002/0138446 A1 | 9/2002 | Antonin et al. | |
| 2004/0088222 A1* | 5/2004 | Suzuki | G06Q 30/0601 705/26.1 |
| 2005/0035192 A1 | 2/2005 | Bonalle et al. | |
| 2008/0133471 A1* | 6/2008 | Burgess | H04L 61/4511 |
| 2008/0250026 A1* | 10/2008 | Linden | G06F 16/904 |
| 2013/0232161 A1* | 9/2013 | Yang | H04L 67/535 707/758 |
| 2013/0343600 A1* | 12/2013 | Kikkeri | G06K 9/00295 382/103 |
| 2014/0379380 A1* | 12/2014 | Callahan | G16H 10/60 705/3 |
| 2015/0215261 A1* | 7/2015 | Zhang | H04L 51/16 709/206 |
| 2015/0348078 A1* | 12/2015 | Alsina | G06Q 30/0214 705/14.16 |
| 2016/0140517 A1* | 5/2016 | Kitano | G07F 17/3251 705/39 |
| 2017/0272447 A1* | 9/2017 | Chen | H04L 29/08 |
| 2017/0279925 A1* | 9/2017 | Zhang | H04L 67/18 |

FOREIGN PATENT DOCUMENTS

| | | |
|---|---|---|
| CN | 105827685 A | 8/2016 |
| JP | 2002024659 A | 1/2002 |
| JP | 2002259804 A | 9/2002 |
| JP | 2003196553 A | 7/2003 |

OTHER PUBLICATIONS

Machine translation of the claims of JP-2002-259804-A downloaded from Japanese Patent Office website on Jul. 21, 2022. (Year: 2022).*

Machine translation of the Description section of JP-2002-259804-A downloaded from Japanese Patent Office website on Jul. 21, 2022. (Year: 2022).*

Translation of CN Office Action from Corresponding CN Application No. 201611109180.2 dated Apr. 1, 2019, a counterpart foreign application for U.S. Appl. No. 16/432,725, 5 pages.

Translation of CN Search Report from Corresponding CN Application No. 201611109180.2 dated Apr. 1, 2019, a counterpart foreign application for U.S. Appl. No. 16/432,725, 2 pages.

English translation of International Search Report dated Mar. 1, 2018, from corresponding PCT Application No. PCT/CN2017/113014, 2 pages.

English translation of Written Opinion dated Mar. 1, 2018, from corresponding PCT Application No. PCT/CN2017/113014, 4 pages.

Japanese Office Action dated Nov. 30, 2021 for Japanese Patent Application No. 2019-530156, a foreign counterpart to U.S. Appl. No. 16/432,725, 6 pages.

* cited by examiner

RECEIVE SERVICE DATA PROCESSING RESULT SENT BY INFORMATION SERVER, WHEREIN SERVICE DATA PROCESSING RESULT IS GENERATED BY INFORMATION SERVER ACCORDING TO SECOND RECORD INFORMATION ABOUT USER AND SERVICE DATA INFORMATION SELECTED BY USER FROM SERVICE DATA INFORMATION, SECOND RECORD INFORMATION ABOUT USER IS DETERMINED BY INFORMATION SERVER ACCORDING TO FIRST RECORD INFORMATION ABOUT USER, FIRST RECORD INFORMATION IS RECORD INFORMATION ABOUT USER REGISTERED WITH INFORMATION SERVER, AND SECOND RECORD INFORMATION IS SECOND RECORD INFORMATION ABOUT USER REGISTERED WITH SERVICE APPARATUS
402

PROCESS RECEIVED SERVICE DATA PROCESSING RESULT
404

FIG. 4

SERVICE DATA PROCESSING METHOD AND DEVICE

CROSS REFERENCE TO RELATED PATENT APPLICATIONS

This application claims priority to and is a continuation of PCT Patent Application No. PCT/CN2017/113014, filed on 27 Nov. 2017 and entitled "SERVICE DATA PROCESSING METHOD AND DEVICE," which claims priority to Chinese Patent Application No. 201611109180.2 filed on 6 Dec. 2016 and entitled "SERVICE DATA PROCESSING METHOD AND DEVICE," which are incorporated herein by reference in their entirety.

TECHNICAL FIELD

The present disclosure relates to the field of Internet information processing technology, and, more particularly, to service data processing methods and service data processing devices.

BACKGROUND

The rapid development of the Internet provides opportunities for developing various online services (for example, online hotel reservation services, online order take-out services, online education services). Provision of various online services also significantly facilitates work and life of users.

Online service providers generally use two strategies in order to improve the number of orders. A first strategy relates to using a member system: member benefits are provided for members by the member system, which may attract new users and improve the loyalty of old users. In order to enjoy the member benefits, the users may fill record information in a service apparatus and register as members of the online service providers. A second strategy relates to publishing service data information on information servers with large website traffic, such as a comprehensive information server, a classified information server or a professional information server, wherein specifically, the professional information server may be an information server.

In the first strategy, an online order placing service data processing method includes steps 11 to 14 in the following:

step 11: a service apparatus receiving a service request sent by a user terminal, wherein selected service data information is included in the service request;

step 12: the service apparatus determining record information about a user using the user terminal and generating an order based on the determined record information and the selected service data information;

step 13: the service apparatus sending the generated order to the user terminal by carrying the generated order in an order confirmation page; and step 14: the service apparatus receiving order confirmation information sent by the user terminal.

In the first manner, since the order is generated based on the record information about the user, the generated order embodies member benefits of the user.

In the second strategy, an online order placing service data processing method includes steps 21 to 24 in the following:

step 21: an information server receiving a service request sent by a user terminal, wherein service data information selected by a user from the service data information is carried in the service request;

step 22: the information server generating an order by using the selected service data information;

step 23: the information server sending the generated order to the user terminal by carrying the generated order in an order confirmation page; and step 24: the information server receiving order confirmation information sent by the user terminal.

In the second manner, the user cannot enjoy member benefits from the online service provider. After browsing service data information published by various online service providers through an information server of a website and selecting desired service data information from the service data information, if the user wants member benefits from the online service providers, the user is required to log on a service apparatus providing selected service data information by using registered record information. The user acquires the selected service data information from the service apparatus again, and then place an order in the service apparatus. In this order placing service implementation process, the user terminal is required to log on different servers successively to perform interaction and repeat the searching for service data information, with undoubtedly multiple times of interaction with the servers, which not only wastes network resources, but also results in a tedious order placing service implementation process for the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a service data processing method and a service data processing device, which is used to solve the problems of wasting network resources and tedious operation of users when they enjoy their member benefits in the conventional techniques.

A service data processing method provided in an example embodiment of the present disclosure is applied to a service implementation system including an information server and a plurality of service apparatuses, wherein the service apparatuses provide service data information to the information server. The method includes the following operations.

The information server receives a service request sent by a user terminal, wherein service data information selected by a user using the user terminal from the service data information is carried in the service request.

Second record information about the user is determining, according to first record information about the user. The second record information about the user is registered with a service apparatus providing the selected service data information. The first record information about the user is record information about the user registered with the information server Service data is processed by using the determined second record information about the user and the selected service data information.

In an example embodiment, the operation of determining the about the user second record information about the user includes the following operations.

Second record information corresponding to first record information about the user is searched from a set of binding relationships between first record information and second record information previously established by the service apparatus providing the selected service data information.

If corresponding second record information is found, the found second record information is used as the second record information about the user registered with the service apparatus providing the selected service data information.

In an example embodiment, the method includes the following operations.

User information about the user is determined if no corresponding second record information is found.

Second record information about the user is acquired by using the user information from the service apparatus providing the selected service data information.

Acquired second record information is used as the second record information if the second record information is acquired.

In an example embodiment, the method further includes the following operations.

A binding relationship between the first record information about the user and the acquired second record information is established after the second record information is acquired; and The set of binding relationships is updated by using the established binding relationship between the first record information and the acquired second record information.

In an example embodiment, the method further includes the following operations.

Public record information in the service apparatus providing the selected service data information is determined if second record information about the user registered with the service apparatus providing the selected service data information is not determined according to the first record information about the user.

Service data is processed by using the determined public record information and the selected service data information.

, In an example embodiment, after second record information about the user registered with the service apparatus providing the selected service data information is not determined, the method further includes the following operations.

User information about the user is determined.

Second record information about the user is acquired by using the determined user information from the service apparatus providing the selected service data information.

A binding relationship between first record information about the user and acquired second record information is established if the second record information is acquired.

In an example embodiment, the information server pre-establishes a set of binding relationships between first record information and second record information for each service apparatus.

Before the information server receives a service request sent by the user terminal, the method further includes the following operations.

A page access request sent by the user terminal is received.

A second record level in bound second record information is determined if, by using the pre-established set of binding relationships, first record information about a user using the user terminal is determined to be bound with second record information.

Service data information corresponding to the second record level in the bound second record information is determined.

The page access request is responded to based on the corresponding service data information.

In an example embodiment, after the operation of receiving a page access request sent by the user terminal, the method further includes the following operations.

A second record level corresponding to a first record level in first record information about the user is searched from a pre-established corresponding relationship between a first record level and a second record level in the service apparatus, if, by using the pre-established set of binding relationships, the first record information about the user using the user terminal is not determined to be bound with second record information.

Service data information corresponding to the found second record level is determined.

The page access request is responded to based on the corresponding service data information.

In an example embodiment, the method further includes the following operations.

If the second record level in the second record information about the user is determined to be changed, stored second record information about the user is updated with the changed second record level.

In an example embodiment, the method further includes the following operations.

A service data processing result is sent to the service apparatus providing the selected service data information.

A service data processing method provided in an example embodiment of the present disclosure is applied to a service implementation system including an information server and a hotel apparatus, wherein the hotel apparatus provides service data information to the information server. The method includes the following operations.

The information server receives an order placing request sent by a user terminal, wherein service data information selected by a user using the user terminal from the service data information is carried in the order placing request.

Second record information about the user is determined according to first record information about the user. The second record information about the user is registered with a hotel apparatus providing the selected service data information. The first record information about the user is record information about the user registered with the information server.

Service data is processed by using the determined second record information about the user and the selected service data information.

A service data processing method provided in an example embodiment of the present disclosure is applied to a service implementation system method including an information server and a plurality of service apparatuses, wherein the service apparatuses provide service data information to the information server. The method includes the following operations.

A service apparatus receives a service data processing result sent by the information server. The service data processing result is generated by the information server according to second record information about a user and service data information selected by the user from the service data information. The second record information about the user is determined by the information server according to first record information about the user. The first record information is record information about the user registered with the information server. The second record information is second record information about the user registered with the service apparatus.

The received service data processing result is processed.

In an example embodiment, the method further includes the following operations.

A record information acquisition request sent by the information server is received, wherein user information about the user is carried in the record information acquisition request.

Second record information about the user by using the user information is determined.

A record information acquisition response is sent to the information server, wherein the determined second record information is carried in the record information acquisition response.

In an example embodiment, the operation of determining second record information about the user by using the user information includes the following operations.

Stored second record information is matched with the user information.

Matched second record information is used as the determined second record information if second record information is matched.

Second record information for the user is created by using the user information if no second record information is matched, and the created second record information is used as the determined second record information.

In an example embodiment, a reference second record level of the user is also carried in the record information acquisition request.

After the second record information is matched, before sending the matched second record information to the information server, the method further includes the following operations.

A second record level in the matched second record information is adjusted by using the reference second record level.

In an example embodiment, the method further includes the following operations.

Changed second record level of the user is sent to the information server if the second record level in the second record information about the user is changed.

A service data processing method provided in an example embodiment of the present disclosure is applied to a service implementation system including an information server and a hotel apparatus, wherein the hotel apparatus provides service data information to the information server. The method includes the following operations.

The hotel apparatus receives a service data processing result sent by the information server, wherein the service data processing result is generated by the information server according to second record information about a user and service data information selected by the user from the service data information after an order placing request from the user is received. The second record information about the user is determined by the information server according to first record information about the user. The first record information is record information about the user registered with the information server. The second record information is second record information about the user registered with the hotel apparatus.

The received service data processing result is processed.

An information server for service data processing provided in an example embodiment of the present disclosure is applied to a service implementation system including an information server and a plurality of service apparatuses, wherein the service apparatuses provide service data information to the information server. The information server includes the following modules.

A first receiving module is configured to receive a service request sent by a user terminal, wherein service data information selected from the service data information by a user using the user terminal is carried in the service request.

A first information determination module is configured to determine, according to first record information about the user, second record information about the user registered with a service apparatus providing the selected service data information, wherein the first record information about the user is record information about the user registered with the information server.

A first service processing module is configured to process service data by using the determined second record information about the user and the selected service data information.

In an example embodiment, the first information determination module is specifically configured to perform the following operations.

Second record information corresponding to first record information about the user is searched from a set of binding relationships between first record information and second record information previously established by the service apparatus providing the selected service data information.

The found second record information is used as the second record information about the user registered with the service apparatus providing the selected service data information if corresponding second record information is found.

In an example embodiment, the first information determination module is further configured to perform the following operations.

User information about the user is determined if no corresponding second record information is found.

Second record information about the user is acquired by using the user information from the service apparatus providing the selected service data information.

Acquired second record information is used as the second record information if the second record information is acquired.

In an example embodiment, the first information determination module is further configured to perform the following operations.

A binding relationship between the first record information about the user and the acquired second record information is established after the second record information is acquired.

The set of binding relationships is updated by using the established binding relationship between the first record information and the acquired second record information.

In an example embodiment, the first information determination module is further configured to perform the following operations.

Public record information in the service apparatus providing the selected service data information is determined if second record information about the user registered with the service apparatus providing the selected service data information is not determined according to the first record information about the user.

The first service processing module is further configured to perform the following operations.

Service data processing is processed by using the determined public record information and the selected service data information.

In an example embodiment, the first information determination module is further configured to perform the following operations.

User information about the user is determined after second record information about the user registered with the service apparatus providing the selected service data information is not determined.

Second record information about the user is acquired by using the user information from the service apparatus providing the selected service data information.

A binding relationship between first record information about the user and acquired second record information is established if the second record information is acquired.

In an example embodiment, the information server pre-establishes a set of binding relationships between first record information and second record information for each service apparatus.

The first information determination module is further configured to perform the following operations.

A page access request sent by a user terminal is received before the information server receives a service request sent by the user terminal.

A second record level in bound second record information is determined, if it is determined that first record information about a user using the user terminal is bound with second record information by using the pre-established set of binding relationships.

Service data information corresponding to the second record level in the bound second record information is determined.

The page access request is responded to based on the corresponding service data information.

In an example embodiment, the first information determination module is further configured to perform the following operations.

A second record level corresponding to a first record level in first record information about the user is searched from a pre-established corresponding relationship between a first record level and a second record level in the service apparatus, if it is determined, by using the pre-established set of binding relationships, that the first record information about the user using the user terminal is not bound with second record information, after receiving a page access request sent by the user terminal.

Service data information corresponding to the found second record level is determined.

The page access request is responded to based on the corresponding service data information.

In an example embodiment, the first information determination module is further configured to perform the following operations.

If it is determined that the second record level in the second record information about the user is changed, stored second record information about the user is updated with the changed second record level.

In an example embodiment, the first service processing module is further configured to perform the following operations.

A service data processing result is sent to the service apparatus providing the selected service data information.

An information server for service data processing provided in an example embodiment of the present disclosure is applied to a service implementation system including an information server and a hotel apparatus, wherein the hotel apparatus provides service data information to the information server. The information server includes the following modules.

A second receiving module is configured to receive for an order placing request sent by a user terminal, wherein service data information selected from the service data information by a user using the user terminal is carried in the order placing request.

A second information determination module is configured to determine, according to first record information about the user, second record information about the user registered with a hotel apparatus providing the selected service data information, wherein the first record information about the user is record information about the user registered with the information server.

A second service processing module is configured to process service data by using the determined second record information about the user and the selected service data information.

A service apparatus for service data processing provided in an example embodiment of the present disclosure is applied to a service implementation system including an information server and a plurality of service apparatuses, wherein the service apparatuses provide service data information to the information server, the service apparatus includes the following modules.

A first result receiving module is configured to receive a service data processing result sent by the information server, wherein the service data processing result is generated by the information server according to second record information about a user and service data information selected by the user from the service data information. The second record information about the user is determined by the information server according to first record information about the user. The first record information is record information about the user registered with the information server. The second record information is second record information about the user registered with the service apparatus.

A first result processing module is configured to process the received service data processing result.

In an example embodiment, the first result receiving module is further configured to perform the following operations.

A record information acquisition request sent by the information server is received, wherein user information about the user is carried in the record information acquisition request.

The first result processing module is further configured to perform the following operations.

Second record information about the user by using the user information is determined.

A record information acquisition response is sent to the information server, wherein the determined second record information is carried in the record information acquisition response.

In an example embodiment, the first result processing module is specifically configured to perform the following operations.

Stored second record information is matched with the user information.

Matched second record information is used as the determined second record information if second record information is matched.

Second record information for the user is created by using the user information if no second record information is matched, and using the created second record information is used as the determined second record information.

In an example embodiment, a reference second record level of the user is also carried in the record information acquisition request.

The first result processing module is further configured to perform the following operations.

A second record level in matched second record information is adjusted by using the reference second record level after the second record information is matched and before the matched second record information is sent to the information server.

In an example embodiment, the first result processing module is further configured to perform the following operations.

Changed second record level of the user is sent to the information server if the second record level in the second record information about the user is changed.

A hotel apparatus for service data processing provided in an example embodiment of the present disclosure is applied to a service implementation system including an information server and a hotel apparatus, wherein the hotel apparatus provides service data information to the information server. The hotel apparatus includes the following modules.

A second result receiving module is configured to receive a service data processing result sent by the information server, wherein the service data processing result is generated by the information server according to second record information about a user and service data information selected by the user from the service data information after receiving an order placing request from the user. The second record information about the user is determined by the information server according to first record information about the user. The first record information is record information about the user registered with the information server. The second record information is second record information about the user registered with the hotel apparatus.

A second result processing module is configured to process the received service data processing result.

The beneficial effects of the present disclosure are as follows:

in the example embodiments of the present disclosure, an information server determines, after receiving a service request from a user and based on first record information about the user registered with the information server, second record information about the user registered with a service apparatus providing selected service data information, which implements, for the same user, one-way communication of the record information about the user registered with the service apparatus to the information server. A subsequent information server may process service data by directly using the determined second record information about the user and the selected service data information. On the basis of ensuring that the user enjoys member benefits provided by the service apparatus, and without requiring the user to log into the information server and perform searching again, the number of times of interaction of the user with the server is reduced, which, compared with the conventional techniques, not only saves network resources, but also simplifies user operations.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and persons of ordinary skill in the art may derive other drawings from these accompanying drawings without creative efforts.

FIG. 4 is a schematic flow chart of another service data processing method provided in an example embodiment of the present disclosure;

DETAILED DESCRIPTION

In order to achieve the technical solutions of the present disclosure, an example embodiment of the present disclosure provides a service data processing method and device, and the method is based on a service implementation system including an information server and service apparatuses.

In this system, the service apparatuses provide service data information to the information server, and a user may browse the service data information when using services provided by the information server, so that the service apparatuses share user resources of the information server, the service data information provided by the service apparatuses to the information server is accessed by more users, and the website traffic for the service apparatuses is improved and it provides users to improve the service providing amount. Moreover, when the user selects service data information from the service data information to perform services, the information server determines, based on first record information about the user registered with the information server, second record information about the user registered with the service apparatuses, and then performs service data processing by using the second record information. In this process, there is no need for the user to interact with the service apparatuses and fill registered second record information or register second record information, which improves the efficiency of order generation, promotes member benefit information about the user and avoids the event that the services cannot be performed due to the poor performance of the service apparatuses.

Furthermore, the example embodiments of the present disclosure implement one-way communication between the information server and the service apparatus record information, a subsequent information server may generate orders by using the determined second record information about the user and the selected service data information directly, and on the basis of ensuring that the user enjoys member benefits provided by the service apparatuses, the number of times of interaction of the user with the server is reduced, which, compared with the conventional techniques, not only saves network resources, but also simplifies user operations, as well as improves user experience.

Figure 1:
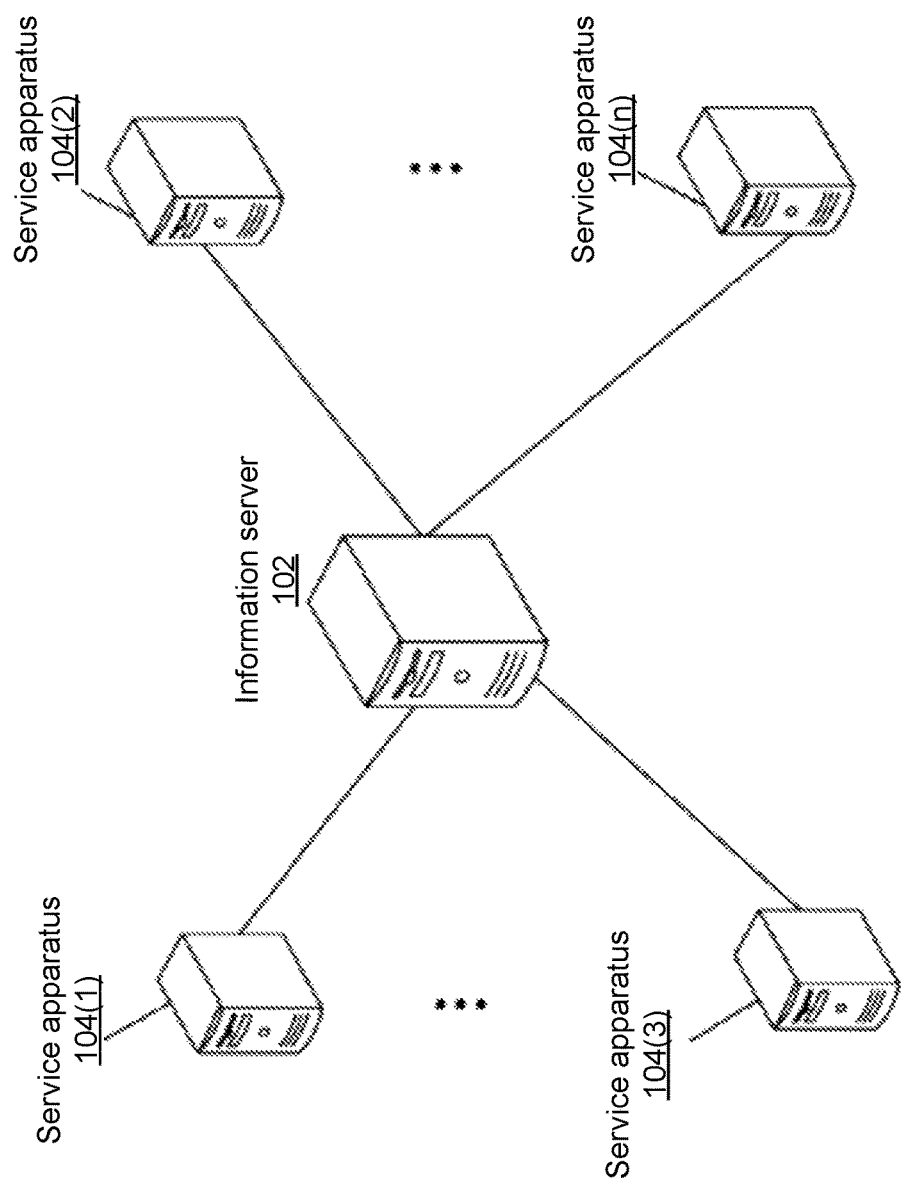
FIG. 1 is a schematic structural diagram of a service implementation system provided in an example embodiment of the present disclosure.

In order to understand the solutions of the example embodiments of the present disclosure clearly, the service implementation system in the example embodiments of the present disclosure is introduced firstly:

As shown in FIG. 1, it is a schematic structural diagram of a service implementation system provided in an example embodiment of the present disclosure, the service implementation system including an information server 102 and one or more service apparatuses 104(1), 104(2), 104(3), . . . , 104(n), wherein n may be any integer, wherein the service apparatus 104 may be one service apparatus and may also be in plural form, and when in plural form, it represents that a plurality of service apparatuses providing different or same online services are coupled with the information server.

The information server 102 is used for: receiving a service request sent by a user terminal, wherein service data information selected from the service data information by a user using the user terminal is carried in the service request; determining, according to first record information about the user, second record information about the user registered with a service apparatus providing the selected service data information; performing service data processing by using determined second record information about the user and the selected service data information; and sending a generated order to the service apparatus.

The service apparatus 104 is used for receiving the order sent by the information server and processing the received order.

The example embodiments of the present disclosure are applicable to any online service scene capable of providing services for users, especially applicable to scenes including online travel services and hotels. This is because with the rapid development of travel industry, the online travel services are increasingly important. The information server is a comprehensive server relating to travel, is accessed by the users for many times, that is, the network traffic is large, and possesses numerous members. Moreover, hotel services of the online travel services are key services of the online travel services, and the development of traditional hotel services is mature. Therefore, in order to improve the number of orders, most hotels have possessed very mature member systems and numerous members. By coupling the information server with service apparatuses of hotels and using the solutions of the example embodiments of the present disclosure, undoubtedly, member benefits of the hotels may be promoted and the number of orders of the hotel services may be improved better. Moreover, since the member benefits from the hotels are provided for the users to enable the users to enjoy member preference and benefits from the hotels, the amount of access to the information server may be improved and the influence of online travel may be expanded.

Detailed description is made below by taking the applying of the example embodiments of the present disclosure to the scenes of online travel services and hotels as an example.

During implementation, the information server may be implemented by one or more servers.

The service apparatus may be one or more servers and may also be a client terminal. If the service apparatus is a client terminal, specifically performed functions may be processed by a cloud server, so that the hotels are not required to build servers.

In order to facilitate examples below, the following firstly illustrates users, service apparatuses, service data information and data information that may be in online travel information service provision servers:

In the example embodiments of the present disclosure, U1, U2 . . . Un are used for representing users, H1, H2 . . . Hn are used for representing hotels, and C1, C2 . . . Cn are used for representing service data information, wherein n is a positive integer greater than or equal to 1.

A service apparatus may store record information about the user registered with the service apparatus, which is referred to as second record information here. For hotel services, the second record information may include but not limited to part or all of information such as a user name, a phone number, an identity number, a second record card number and a second record level. For other services, the second record information may vary according to service requirements.

An information server may store record information about the user registered with the information server, which is referred to as first record information here. The first record information may include part or all of information such as a user name, a phone number, an identity number, a first record card number and a first record level.

The information server may also store, with regard to each service apparatus, second record information registered with the service apparatus, and store a set of binding relationships between first record information about each user and second information record registered with the service apparatus. For example, for a service apparatus of a hotel H1, second record information registered with the service apparatus of the hotel H1 is stored, and a set of binding relationships between first record information and the second information record registered with the service apparatus of the hotel H1 is stored; and for a service apparatus of a hotel H2, second record information registered with the service apparatus of the hotel H2 is stored, and binding relationships between first record information about each user and the second information record registered with the service apparatus of the hotel H2 is stored.

The binding relationship may be stored in the form of a data table, the data table may include fields such as a user name, an identity number, a phone number, a first record level, a second record level and a second record card number, and a piece of data represents a binding relationship between first record information and second record information about a user. The binding relationship established here may be regarded as a presenting form of record information communication between the service apparatus and the information server. However, for each service apparatus, since the information server establishes a binding relationship with each service apparatus respectively, there is no record information communication between various service apparatuses, thereby guaranteeing the data safety of the second record information in each service apparatus.

Furthermore, the information server may also store, with regard to each service apparatus, a corresponding relationship between a first record level and a second record level of the service apparatus; in the event of registering as a service apparatus record with the information server, for the setting of a level of a second record in the second record information about the user, reference may be made to the corresponding relationship; and in the event of displaying service data information in the service apparatus to new members, the service data information displayed to the user may also be determined with reference to the corresponding relationship.

For the new members, the following situations are included: 1) the user has become a member of the information server by registering with a page of the information server on line; 2) the user registers as a member of the information server off line; and 3) the user has never registered as a member of the service apparatus by any way.

For situations 1) and 2), the information server is not aware that the user has registered as a member of the information server, and therefore, for situations 1), 2), and 3), the users may be considered as the new members of the service apparatus firstly.

For example, assuming that first record levels set by the information server include three levels F1, F2, and F3, wherein the level F3 is higher than the level F2 and the level F2 is higher than the level F1, for the hotel H1 and the hotel H2, second record levels of the hotel H1 include a silver card level, a golden card level, and a platinum card level, and second record levels of the hotel H2 include copper card level, a silver card level, and a golden card level.

At this point, for the hotel H1, a corresponding relationship between record levels may be as follows: F1 corresponds to the silver card level of the hotel H1; F2 corresponds to the golden card level of the hotel H1; and F3 corresponds to the platinum card level of the hotel H1.

For the hotel H2, a corresponding relationship between record levels may be as follows: F1 corresponds to the copper card level of the hotel H2; F2 corresponds to the silver card level of the hotel H2; and F3 corresponds to the golden card level of the hotel H2.

Figure 2:
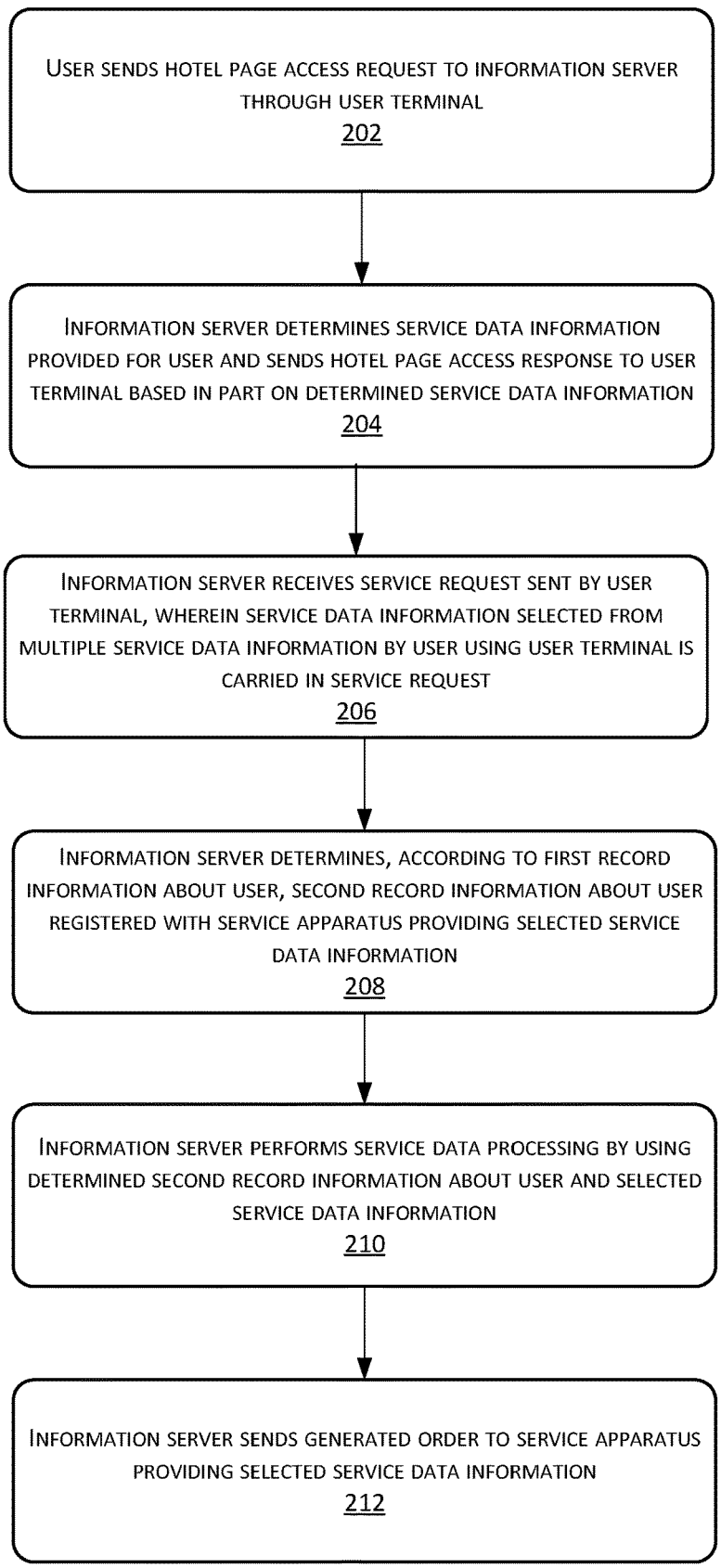
FIG. 2 is a schematic flow chart of a service data processing method provided in an example embodiment of the present disclosure.

The solutions of the example embodiments of the present disclosure are described below in detail in conjunction with the accompanying drawings:

As shown in FIG. 2, it is a schematic flow chart of a service data processing method provided in an example embodiment of the present disclosure, the service data processing method including the following steps:

Step 202: a user sends a hotel page access request to an information server though a user terminal.

The user here may be a user having logged on the information server, and since the example embodiment of the present disclosure is illustrated by using hotel services, this step relates to sending the hotel page access request to the information server. Search keywords may be included in the hotel page access request.

Step 204: the information server determines service data information provided for the user and sends a hotel page access response to the user terminal based in part on the determined service data information.

The information server may determine the service data information based on the search keywords of the user.

Here, considering that each hotel has its own orientation, preferential prices and services that may be provided with regard to different record levels are also different as well as the expectation of the user for hotels. Therefore, in the present disclosure, the service apparatus enables each second record level to correspond to the service data information, and different record levels may correspond to different service data information.

Next, in order to provide for users of different record levels service data information corresponding to the levels accurately, in the example embodiments of the present disclosure, the following is included: determining, by firstly using a set of binding relationships between first record information and second record information, which is pre-established for the service apparatus, whether first record information about a user using the user terminal is bound with second record information; if so, determining a second record level in the bound second record information, and then responding to the page access request based on service data information corresponding to the determined second record level; if not, searching for a second record level corresponding to a first record level in first record information about the user from a pre-stored corresponding relationship between each first record level and a second record level in the service apparatus, and then determining service data information corresponding to the found second record level; and finally, responding to the page access request based in part on the found service data information.

For example, assuming that a first record level in first record information about a user U1 registered with the information server is F2, and the first record information about the user U1 is neither bound with second record information about the user U1 registered with the service apparatus of the hotel H1, nor bound with second record information about the user U1 registered with the service apparatus of the hotel H2, at this point, if it is determined that the first record information about the user using the user terminal is not bound with second record information, according to the above pre-set corresponding relationship between the record levels, a record level of the hotel H1 to which F2 corresponds is the golden card level, and a record level of the hotel H2 to which F2 corresponds is the silver card level. Here, service data information corresponding to the golden card level of the hotel H1 is C1 and C2, service data information corresponding to the silver card level of the hotel H1 is C3 and C4, service data information corresponding to the silver card level of the hotel H2 is C5 and C6, and service data information corresponding to the copper card level of the hotel H2 is C7 and C8.

If a user of higher record level may browse and purchase service data information that a user of lower record level may purchase, at this point, the information server may obtain the service data information C1 to C8 firstly, and then sends the obtained service data information C1 to C8 to the user U1 as page access responses.

Assuming that a first record level in first record information about a user U2 registered with the information server is F2, and the first record information about the user U2 is bound with second record information about the user U2 registered with the service apparatus of the hotel H1, but not bound with second record information about the user U2 registered with the service apparatus of the hotel H2, at this point, if it is determined that the first record information about the user using the user terminal is bound with second record information and the second record information is registered with the server of the hotel H1, a second record level in the second record information about the user U2 registered with the server of the hotel H1 may be determined. Assuming that a record level of the user U2 in the hotel H1 is determined to be the platinum card level, then it is required to determine that service data information corresponding to the platinum card level of the hotel H1 is C9 and C10, and then response is made to the above page access request based in part on the service data information C9 and C10.

At this point, specifically responded contents include the service data information C9 and C10. If a user of a higher record level may browse and purchase service data information that a user of lower record level may purchase, at this point, it is also required to learn that service data information corresponding to the golden card level of the hotel H1 is C1 and C2, and service data information corresponding to the silver card level of the hotel H1 is C3 and C4.

Furthermore, considering that service data information in the service apparatus of the hotel H2 is required to be displayed so as to provide large space of selection for the user U2, in the event that the first record information about the user U2 is not bound with the second record information about the user U2 registered with the service apparatus of the hotel H2, from the pre-stored corresponding relationship between each first record level and a second record level in the service apparatus of the hotel H2, it may be found that a second record level corresponding to F2 in the first record information about the user U2 is the silver card level, and then it is determined that service data information corresponding to the silver card level of the hotel H2 is determined to be C5 and C6 and service data information corresponding to the copper card level of the hotel H2 is C7 and C8.

At this point, the information server may obtain the service data information C1 to C10 firstly, and then sends the obtained service data information C1 to C10 to the user U1 as page access responses.

Approaches for acquiring service data information by the information server include the following two approaches:

A first approach includes the following three steps:

a first step: after learning that a hotel level of the hotel H1 corresponding to the level F2 is the golden card level and a hotel level of the hotel H2 corresponding to the level F2 is the silver card level, the information server sending a first service data information acquisition request to the service apparatus of the hotel H1 and sending a second service data information acquisition request to the service apparatus of the hotel H2, wherein information about the golden card level of the hotel H1 is carried in the first service data information acquisition request and information about the silver card level of the hotel H2 is carried in the second service data information acquisition request;

a second step: the service apparatus of the hotel H1 receiving the first service data information acquisition request, determining, by using the golden card level information in the first service data information acquisition request, that service data information required to be searched is service data information corresponding to the golden card level and service data information corresponding to the silver card level, searching for a table of stored corresponding relationships between record levels and service data information, and obtaining service data information C1 and C2 corresponding to the golden card level and service data information C3 and C4 corresponding to the silver card level; and the service apparatus of the hotel H2 receiving the second service data information acquisition request, determining, by using the silver card level information in the second service data information acquisition request, that service data information required to be searched is service data information corresponding to the silver card level and service data information corresponding to the copper card level, searching for a table of stored corresponding relationships between record levels and service data information, and obtaining service data information C5 and C6 corresponding to the copper card level and service data information C7 and C8 corresponding to the silver card level; and a third step: the service apparatus of the hotel H1 sending the found service data information C1 to C4 to the information server by carrying the same in a first service data information acquisition response, wherein to this end, the information server obtains the service data information C1 and C2 corresponding to the golden card level of the hotel H1 and the service data information C3 and C4 corresponding to the silver card level of the hotel H1; and the service apparatus of the hotel H2 sending the found service data information C5 to C8 to the information server by carrying the same in a second service data information acquisition response, wherein to this end, the information server obtains the service data information C5 and C6 corresponding to the copper card level of the hotel H2 and the service data information C7 and C8 corresponding to the silver card level of the hotel H2.

A second approach:

the information server obtaining a corresponding relationship between record levels of each hotel and service data information by previously sending, to each service apparatus, a corresponding relationship acquisition request between record levels and service data information or a corresponding relationship between record levels and service data information, which is sent by each service apparatus periodically or proactively after the stored corresponding relationship between record levels and service data information changes; and then, the information server obtaining, based on the obtained corresponding relationship between record levels of each hotel and service data information, service data information C1 and C2 corresponding to the golden card level of the hotel H1, service data information C3 and C4 corresponding to the silver card level of the hotel H1, service data information C5 and C6 corresponding to the copper card level of the hotel H2, and service data information C7 and C8 corresponding to the silver card level of the hotel H2.

With step 204, after receiving a page including the service data information C1 to C8 through the user terminal, the user U1 may select and purchase service data information therefrom (for example, the service data information C2 is purchased) and submit the same to the information server. At this point, it also means that a service request is sent to the information server.

Step 206: the information server receives a service request sent by a user terminal, wherein service data information selected from the multiple service data information by a user using the user terminal is carried in the service request;

Step 208: the information server determines, according to first record information about the user, second record information about the user registered with a service apparatus providing the selected service data information;

in this step, considering that record systems of various service apparatuses are different, a member system of the information server cannot meet the requirements of member systems of various service apparatus. Therefore, here, the member system of the information server is not used directly to perform service data processing, that is, the first record information about the user is not used to perform service data processing. Instead, the first record information about the user is used to determine the second record information about the user registered with the service apparatus providing the selected service data information, and in turn, the determined second information is used to perform service data processing.

Following examples in step 204, in step 208, the information server determines, according to the first record information about the user U1, second record information about the user U1 registered with the service apparatus of the hotel H1 providing the service data information C2.

Here, if the second record information about the user registered with the service apparatus providing the selected service data information is not determined according to the first record information about the user (for example, the second record information cannot be determined due to network failure, system error or the like), public record information in the service apparatus providing the selected service data information is determined, and then service data processing may be performed by using the determined public record information and the selected service data information.

Moreover, after the second record information about the user registered with the service apparatus providing the selected service data information is not determined (for example, after the recovery of network failure, system error or the like), user information about the user may also be determined; second record information about the user is acquired, by using the determined user information, from the service apparatus providing the selected service data information; and if the second record information is acquired, a binding relationship between the first record information about the user and the acquired second record information is established.

There may be a plurality of specific implementations of step 208 in the following, for example:

A first implementation: considering that for the same user U1, part of information in the first record information and the second information about the user may be the same, for example, the same information may be a telephone number and an identity number, when second record information about the hotel H1 is not stored in the information server, the telephone number in the first record information may be used to search for second record information including a telephone number of the user U1 from second record information stored in the service apparatus of the hotel H1; and when the second record information about the hotel H1 is stored in the information server, the telephone number in the first record information may be used to search for the second record information including the telephone number of the user U1 from the second record information stored in the information server.

Here, if the second record information cannot be found, that is, the user U1 is not registered as record information with the service apparatus of the hotel H1, the first record information may be used to automatically register the user U1 as a record of the hotel H1, so that the second record information about the user U1 is obtained. At this point, when the user U1 is registered as a record of the hotel H1, for the setting of second record levels in the second record information about the user U1, reference may be made to the stored corresponding relationship between first record levels and second record levels of the service apparatus of the hotel H1.

Figure 3:
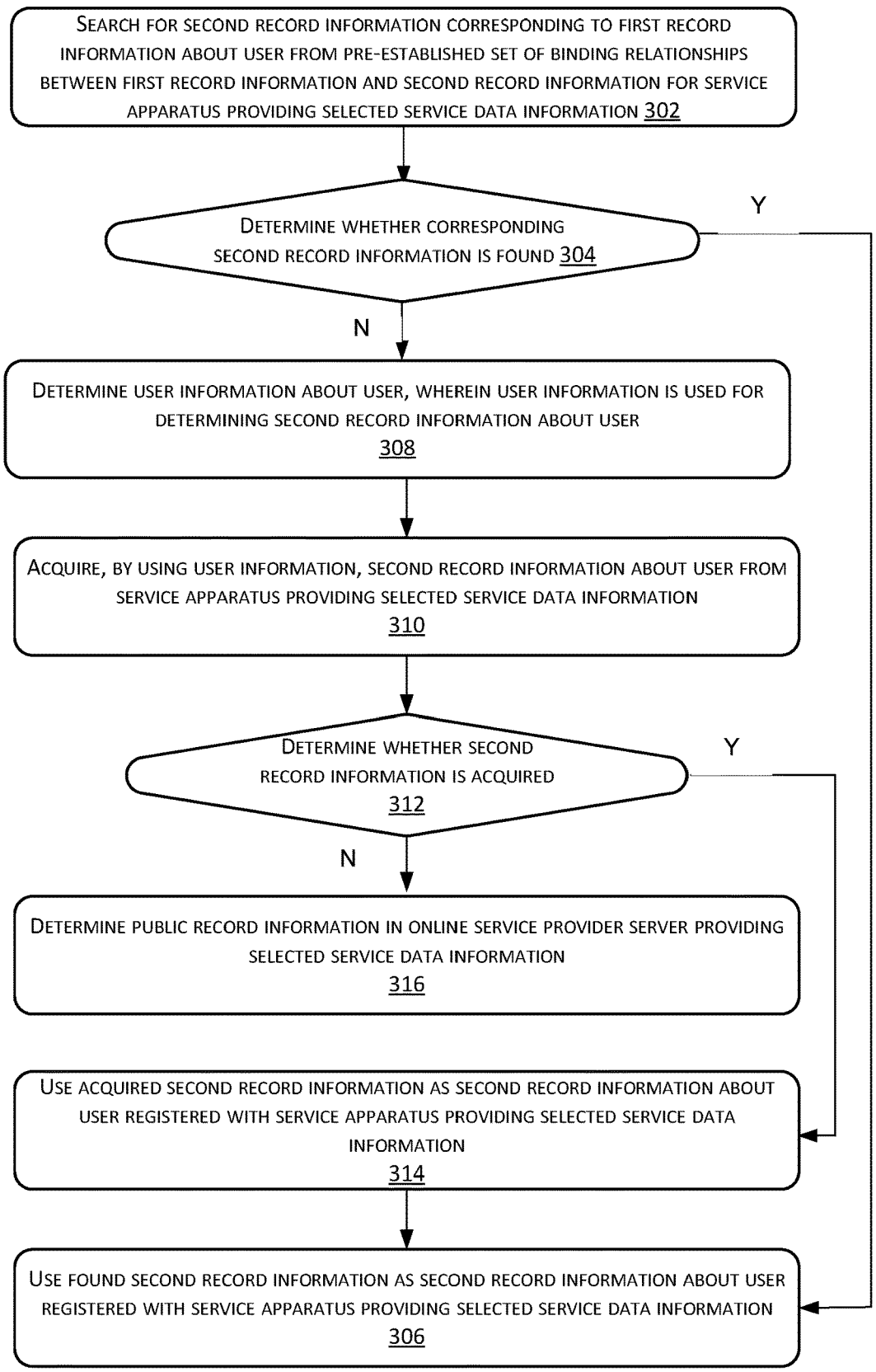
FIG. 3 is a schematic flow chart of a method for searching for second record information in a service apparatus according to an example embodiment of the present disclosure.

A second implementation: with the first implementation of step 208, although the second record information about the user may be determined, considering that same fields are required in the first record information and the second record information on one hand and the same fields are required meet the event of uniquely determining a piece of second record information, there may not exist same fields in the first record information and the second record information. When there exist same fields and the same fields may uniquely determine a piece of second record information, the first implementation is feasible, and when the first record information and the second record information do not have same fields, the first implementation is not feasible. Therefore, in the second implementation of step 208, for each service apparatus, a set of binding relationships between first record information and second record information in the service apparatus may be pre-established. At this point, since second record information corresponding to the first record information about the user in the pre-established set of binding relationships is accurate, it is also accurate to use the first record information about the user to search for second record information about the user registered with the service apparatus providing the selected service data information. A specific flow chart is as shown in FIG. 3 and includes the following steps:

Step 302: searching for second record information corresponding to first record information about the user from a pre-established set of binding relationships between first record information and second record information for the service apparatus providing the selected service data information;

following examples in step 204, second record information about the user U1 is searched from a pre-established set of binding relationships between first record information and second record information for the service apparatus of the hotel H1.

Step 304: determining whether corresponding second record information is found; if so, performing step 306; and if not, performing step 308;

Step 306: using found second record information as second record information about the user registered with the service apparatus providing the selected service data information;

Step 308: determining user information about the user, wherein the user information is used for determining second record information about the user;

when the second record information about the user U1 is not found, it is indicated that the information server does not establish a binding relationship between the first record information about the user U1 and the second record information about the user registered with the service apparatus of the hotel H1. However, the user U1 may have registered with a physical store and website of the hotel H1 previously. Therefore, in step 308, user information for determining the second record information about the user U1 is required to be determined. A specific method of determining the user information about the user U1 may relate to obtaining by extracting from the first record information about the user or obtaining by interacting with the user, for example, sending, to a user terminal used by the user U1, an order fill-in page including user information fill-in fields, receiving the order fill-in page sent by the user terminal with user information filled in, and determining the filled user information to be the user information about the user U1.

Step 310: acquiring, by using the user information, second record information about the user from the service apparatus providing the selected service data information;

specifically, the information server may send a record information acquisition request to the service apparatus of the hotel H1, wherein the user information is carried in the record information acquisition request.

After receiving the record information acquisition request, the service apparatus of the hotel H1 determines the second record information about the user U1 by using the user information.

The process for the service apparatus of the hotel H1 to determine the second record information about the user U1 may relate to:

matching stored second record information with the user information;

using matched second record information as determined second record information if second record information is matched; creating second record information for the user by using the user information if no second record information is matched, and using created second record information as determined second record information; and then, the service apparatus of the hotel H1 sending the matched or created second record information to the information server.

Here, when the user U1 is not a member of the hotel H1, the user may register as a member of the hotel H1 with the information server, so that the scale of members of the hotel H1 is enlarged, a binding relationship with first record information about the user registered with the information server may be established based on registered second record information, and the user may enjoy benefits of members of the hotel H1 subsequently, which omits the tedious process for the user to search one by one and register as a member of each hotel, reduces the number of times for the user to interact with the service apparatus, saves user traffic and improves user experience.

In order to synchronize record levels in the second record information about the user U1 in time by using a first record level, optionally, a reference second record level of the user is also carried in the record information acquisition request.

After the second record information is matched, before sending the matched second record information to the information server, the method further includes:

adjusting a second record level in the matched second record information by using the reference second record level.

Of course, if the corresponding relationship is stored in the service apparatus, the second record level in the matched second record information may be adjusted by using the pre-stored corresponding relationship.

Step 312: determining whether second record information is acquired; if so, performing step 314; and if not, performing step 316;

here, considering problems such as performance of the service apparatus of the hotel H1 and network congestion, when the user U1 is waiting for a response to a service request, it is required to determine whether second record information is acquired over a set period of time, and if second record information cannot be acquired, the following step 316 is performed in order to ensure that the user obtains a service data processing result in a certain period of time.

Step 314: using the acquired second record information as second record information about the user registered with the service apparatus providing the selected service data information;

optionally, in order to facilitate sending a service request again by the user so as to determine second record information about the user, after second record information about the user is acquired, the method further includes: establishing a binding relationship between first record information about the user and the acquired second record information; and updating the set of binding relationships by using the established binding relationship between the first record information and the acquired second record information.

Step 316: determining public record information in the service apparatus providing the selected service data information;

when second record information about the user U1 is not acquired, in order to ensure that the user performs services smoothly, in step 316, public record information in the service apparatus of the hotel H1 is determined and service data processing is performed by using the public record information.

Here, the public record information may be divided according to record levels, for example, for the hotel H1, its public record information includes public record information about the silver card level, public record information about the golden card level, and public record information about the platinum card level. In step 316, it may be determined to use public record information about the golden card level in service apparatus of the hotel H1 based on a first record level F2 of the user U1 as well as a corresponding relationship between a first record level of the information server and a second record level of the hotel H1.

When second record information about the user U1 is not acquired, in order to establish a binding relationship between the first record information about the user U1 and second record information about the hotel H1, user information about the user U1 is required to be recorded, so that when the service apparatus of the hotel H1 is idle or network conditions are better, an operation of acquiring second record information about the user U1 from the service apparatus of the hotel H1 by using the user information about the user U1 is performed again. At this point, if second record information is acquired, a binding relationship between the first record information about the user U1 and the acquired second record information is established.

Step 210: the information server performs service data processing by using the determined second record information about the user and the selected service data information;

here, the service data processing specifically may be generating an order.

If second record information about the user U1 is not determined in step 208, but public record information is determined, at this point, step 210 includes:

performing service data processing by using the determined public record information and the selected service data information.

Step 212: the information server sends the generated order to the service apparatus providing the selected service data information;

thereafter, the service apparatus of the hotel H1 may process a service data processing result for the user U1. When the above service data processing result is generating an order, the processing the service data processing result for the user U1 here may include confirmation of order generation, confirmation of orders, confirmation of transactions or the like.

Furthermore, considering that a first record level and a second record level of the user may be improved or lowered over time, in order to synchronize recorded levels of first record information about the user in the information server and second record information about the user in each service apparatus, improve user experience and increase the amount of access to the information server and the amount of order placing in the service apparatus, the method further includes:

synchronizing a second record level in the second record information about the user by using a pre-stored corresponding relationship between each first record level and second record level and the changed first record level if the information server determines that a first record level in the first record information about the user changes, and sending the synchronized second record level of the user to the service apparatus.

For example, if a first record level of the user U1 changes from F2 to F3, the information server, with respect to the service apparatus of the hotel H1, determines that F3 corresponds to the platinum card level of the hotel H1, notifies the service apparatus of the hotel H1 that a second record level of the user U1 changes to the platinum card level, and synchronizes a second record level in second record information about the user U1 registered with the service apparatus of the hotel H1 to the platinum card level after receiving the confirmation from the service apparatus of the hotel H1 that the second record level of the user U1 changes to the platinum card level. If the information server, with respect to the service apparatus of the hotel H2, determines that F3 corresponds to the golden card level of the hotel H2, notifies the service apparatus of the hotel H2 that the second record level of the user U1 changes to the golden card level, and synchronizes a second record level in second record information about the user U1 registered with the service apparatus of the hotel H2 to the golden card level after receiving the confirmation from the service apparatus of the hotel H2 that the second record level of the user U1 changes to the golden card level.

For example, if the information server determines, with respect to hotel H1, that the second record level of the user U1 changes from the golden card level to the platinum card level, the information server determines, with respect to the service apparatus of the hotel H1, that F3 corresponds to the platinum card level of the hotel H1, so that the first record level of the user U1 in the information server may be synchronized to F3. If the information server determines, with respect to the hotel H2, that the second record level of the user U1 changes from the silver card level to the golden card level, the information server determines, with respect to the service apparatus of the hotel H2, that F3 corresponds to the golden card level of the hotel H2, so that the first record level of the user U1 in the information server may be synchronized to F3.

Here, during changing the second record level in the second record information about the user, in order to synchronize the first record level in the first record information about the user in the information server with the second record level in the second record information in the service apparatus, the information server sends the changed second record level of the user to the service apparatus.

After receiving the synchronized second record level of the user sent by the information server, the service apparatus updates the second record level in the second record information about the user.

Principles for synchronizing the first record level with the second record level may relate to the following: when the first record level changes, the second record level of the service apparatus may be changed by using a corresponding relationship between levels; and when the second record level of the service apparatus changes, the information server is notified, and the information server updates stored second record information.

As shown in FIG. 4, another service data processing method provided in an example embodiment of the present disclosure is applied to a service implementation system including an information server and a plurality of service apparatuses, wherein the service apparatuses provide service data information to the information server, the service data processing method including:

step 402: a service apparatus receives a service data processing result sent by the information server, wherein the service data processing result is generated by the information server according to second record information about a user and service data information selected by the user from the service data information, the second record information about the user is determined by the information server according to first record information about the user, the first record information is record information about the user registered with the information server, and the second record information is second record information about the user registered with the service apparatus; and step 404: the service apparatus processes the received service data processing result.

Optionally, the method further includes:

receiving a record information acquisition request sent by the information server, wherein user information about the user is carried in the record information acquisition request;

determining second record information about the user by using the user information; and sending a record information acquisition response to the information server, wherein the determined second record information is carried in the record information acquisition response.

Optionally, determining second record information about the user by using the user information includes:

matching stored second record information with the user information;

using matched second record information as the determined second record information if second record information is matched; and creating second record information for the user by using the user information if no second record information is matched and using the created second record information as the determined second record information.

Optionally, a reference second record level of the user is also carried in the record information acquisition request.

After the second record information is matched, before sending the matched second record information to the information server, the method further includes:

adjusting a second record level in the matched second record information by using the reference second record level.

Optionally, the method further includes:

sending changed second record level of the user to the information server if the second record level in the second record information about the user is changed.

In the implementation, the service apparatus of the example embodiments of the present disclosure may be a hotel apparatus.

Based on the same inventive concepts, an information server is also provided in the example embodiments of the present disclosure. Since principles for this apparatus to solve problems are similar to those of the service data processing method of the example embodiments of the present disclosure, for implementation of the apparatus, reference may be made to implementation of the method, and repeated contents will not be described further.

Figure 5:
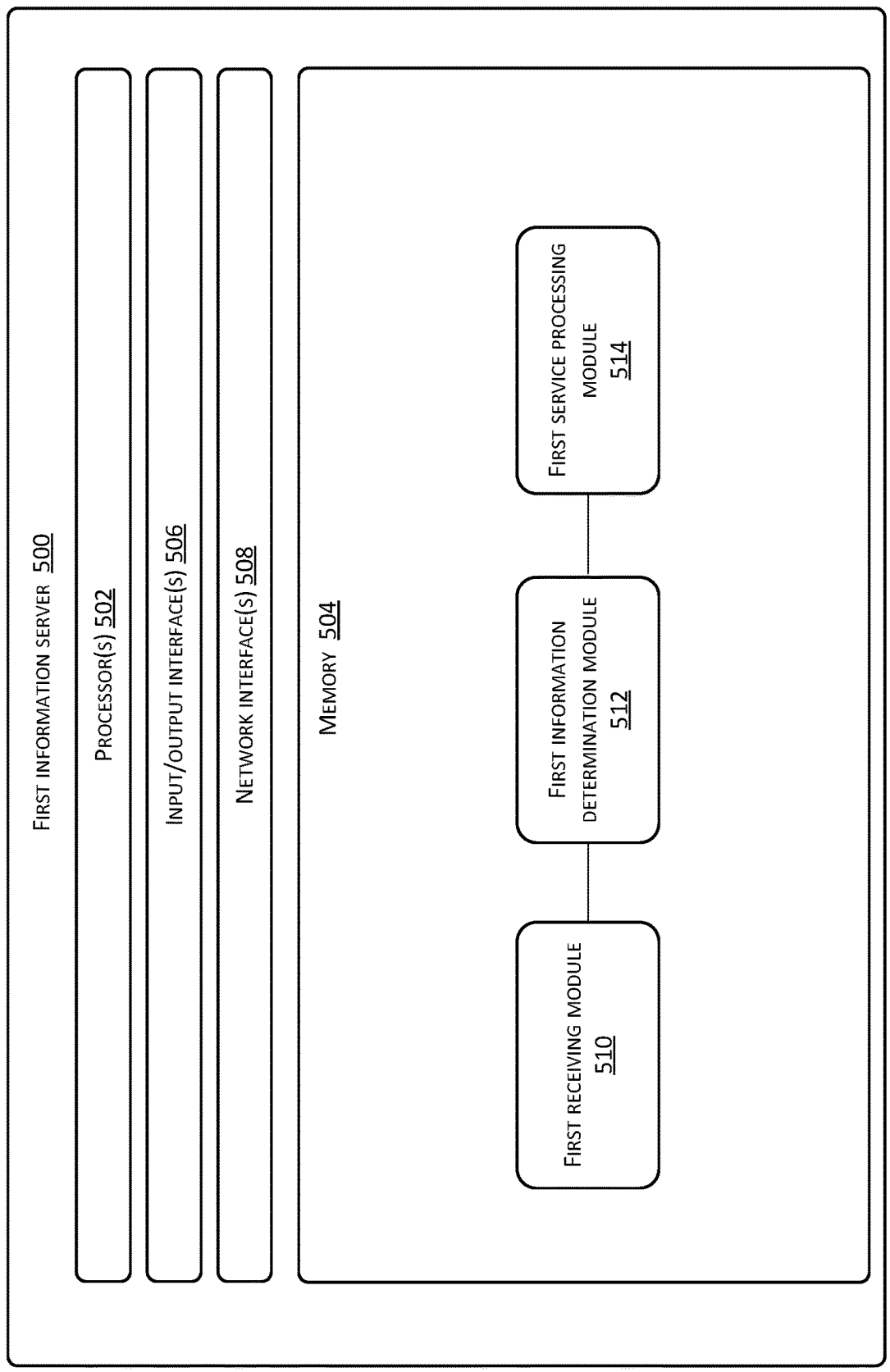
FIG. 5 is a schematic structural diagram of a first information server according to an example embodiment of the present disclosure.

As shown in FIG. 5, a first information server 500 of an example embodiment of the present disclosure is applied to a service implementation system including an information server and a plurality of service apparatuses, wherein the service apparatuses provide service data information to the information server. As show in FIG. 5, the first information server 500 may include one or more processor(s) 502 or data processing unit(s) and memory 504. The first information server 500 may further include one or more input/output interface(s) 506 and one or more network interface(s) 508. The memory 504 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 504 may store therein a plurality of modules or units including:

a first receiving module 510 for receiving a service request sent by a user terminal, wherein service data information selected from the service data information by a user using the user terminal is carried in the service request;

a first information determination module 512 for determining, according to first record information about the user, second record information about the user registered with a service apparatus providing the selected service data information, wherein the first record information about the user is record information about the user registered with the information server; and a first service processing module 514 for performing service data processing by using the determined second record information about the user and the selected service data information.

Optionally, the first information determination module 512 is specifically used for:

searching for second record information corresponding to first record information about the user from a set of binding relationships between first record information and second record information previously established by the service apparatus providing the selected service data information; and using found second record information as the second record information about the user registered with the service apparatus providing the selected service data information if corresponding second record information is found.

Optionally, the first information determination module 512 is further used for:

determining user information about the user if no corresponding second record information is found;

acquiring, by using the user information, second record information about the user from the service apparatus providing the selected service data information; and using acquired second record information as the second record information if the second record information is acquired.

Optionally, the first information determination module 512 is further used for:

establishing a binding relationship between the first record information about the user and the acquired second record information after the second record information is acquired; and updating the set of binding relationships by using the established binding relationship between the first record information and the acquired second record information.

Optionally, the first information determination module 512 is further used for:

determining public record information in the service apparatus providing the selected service data information if second record information about the user registered with the service apparatus providing the selected service data information is not determined according to the first record information about the user;

The first service processing module 514 is further used for:

performing service data processing by using the determined public record information and the selected service data information.

Optionally, the first information determination module 512 is further used for:

determining user information about the user after second record information about the user registered with the service apparatus providing the selected service data information is not determined;

acquiring, by using the determined user information, second record information about the user from the service apparatus providing the selected service data information; and establishing a binding relationship between first record information about the user and acquired second record information if the second record information is acquired.

Optionally, the information server pre-establishes a set of binding relationships between first record information and second record information for each service apparatus.

The first information determination module 512 is further used for:

receiving a page access request sent by a user terminal before the information server receives a service request sent by the user terminal;

determining a second record level in bound second record information if it is determined, by using the pre-established set of binding relationships, that first record information about a user using the user terminal is bound with second record information;

determining service data information corresponding to the second record level in the bound second record information; and responding to the page access request based on the corresponding service data information.

Optionally, the first information determination module 512 is further used for:

searching for a second record level corresponding to a first record level in first record information about the user from a pre-established corresponding relationship between a first record level and a second record level in the service apparatus, if it is determined, by using the pre-established set of binding relationships, that the first record information about the user using the user terminal is not bound with second record information, after the receiving a page access request sent by the user terminal;

determining service data information corresponding to the found second record level; and responding to the page access request based on the corresponding service data information.

Optionally, the first information determination module 512 is further used for:

if it is determined that the second record level in the second record information about the user is changed, updating stored second record information about the user with the changed second record level.

Optionally, the first service processing module 514 is further used for:

sending a service data processing result to the service apparatus providing the selected service data information.

Figure 6:
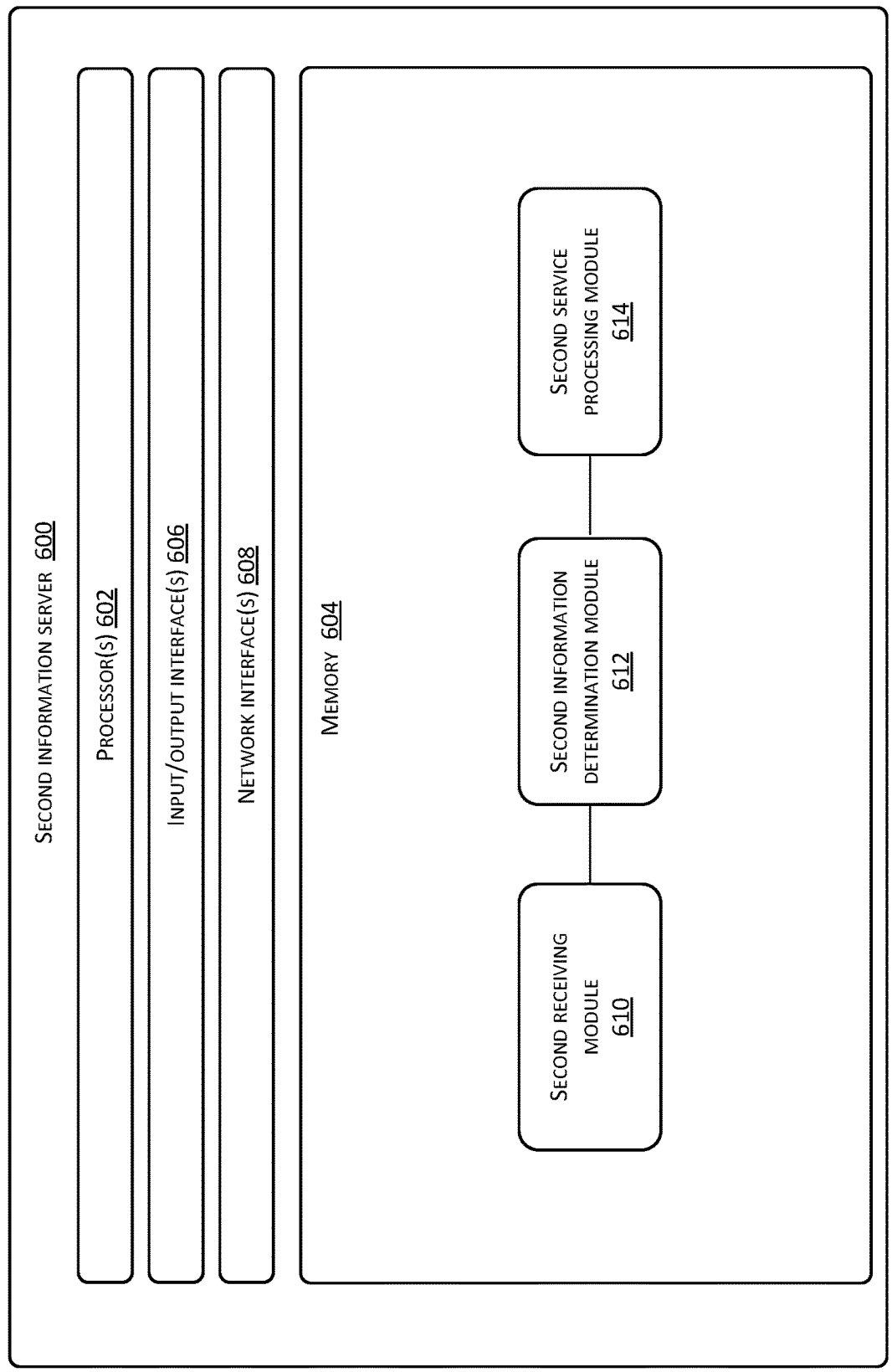
FIG. 6 is a schematic structural diagram of a second information server according to an example embodiment of the present disclosure.

As shown in FIG. 6, a second information server 600 of an example embodiment of the present disclosure is applied to a service implementation system including an information server and a hotel apparatus, wherein the hotel apparatus provides service data information to the information server. As shown in FIG. 6, the second information server 600 may include one or more processor(s) 602 or data processing unit(s) and memory 604. The second information server 600 may further include one or more input/output interface(s) 606 and one or more network interface(s) 608. The memory 604 is an example of computer readable medium or media.

The memory 604 may store therein a plurality of modules or units including:

a second receiving module 610 for receiving an order placing request sent by a user terminal, wherein service data information selected from the service data information by a user using the user terminal is carried in the order placing request;

a second information determination module 612 for determining, according to first record information about the user, second record information about the user registered with a hotel apparatus providing the selected service data information, wherein the first record information about the user is record information about the user registered with the information server; and a second service processing module 614 for performing service data processing by using the determined second record information about the user and the selected service data information.

Based on the same inventive concepts, a service apparatus and a hotel apparatus are also provided in the example embodiments of the present disclosure. Since principles for this apparatus to solve problems are similar to those of the service data processing method of the example embodiments of the present disclosure, for implementation of the apparatus, reference may be made to implementation of the method, and repeated contents will not be described further.

Figure 7:
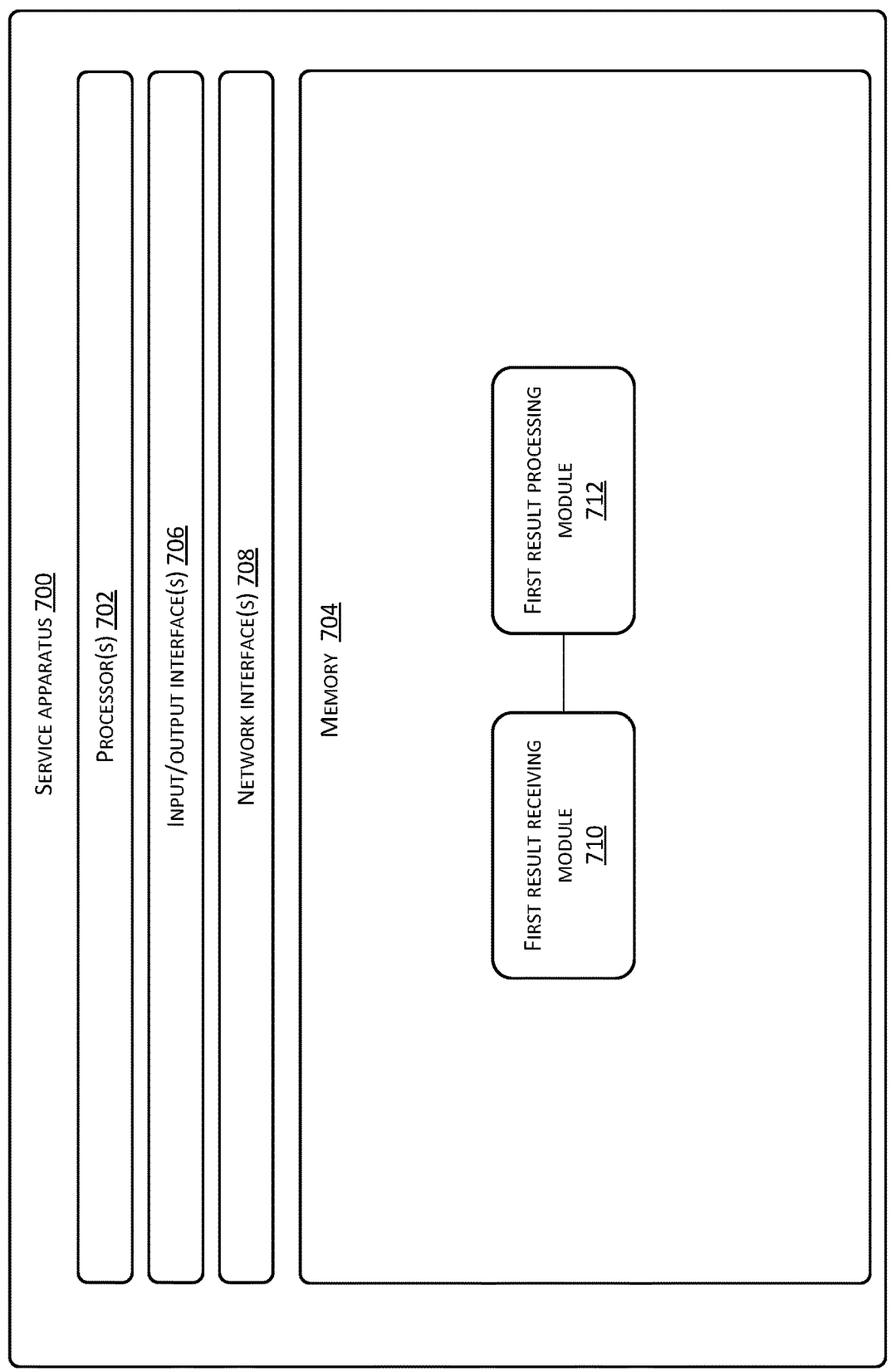
FIG. 7 is a schematic structural diagram of a service apparatus according to an example embodiment of the present disclosure.

As shown in FIG. 7, a service apparatus 700 of an example embodiment of the present disclosure is applied to a service implementation system including an information server and a plurality of service apparatuses, wherein the service apparatuses provide service data information to the information server.

As shown in FIG. 7, the service apparatus 700 may include one or more processor(s) 702 or data processing unit(s) and memory 704. The service apparatus 700 may further include one or more input/output interface(s) 706 and one or more network interface(s) 708. The memory 704 is an example of computer readable medium or media.

The memory 704 may store therein a plurality of modules or units including:

a first result receiving module 710 for receiving a service data processing result sent by the information server, wherein the service data processing result is generated by the information server according to second record information about a user and service data information selected by the user from the service data information, the second record information about the user is determined by the information server according to first record information about the user, the first record information is record information about the user registered with the information server, and the second record information is second record information about the user registered with the service apparatus; and a first result processing module 712 for processing the received service data processing result.

Optionally, the first result receiving module 710 is further used for:

receiving a record information acquisition request sent by the information server, wherein user information about the user is carried in the record information acquisition request;

The first result processing module 712 is further used for:

determining second record information about the user by using the user information; and sending a record information acquisition response to the information server, wherein the determined second record information is carried in the record information acquisition response.

Optionally, the first result processing module 712 is specifically used for:

matching stored second record information with the user information;

using matched second record information as the determined second record information if second record information is matched; and creating second record information for the user by using the user information if no second record information is matched and using the created second record information as the determined second record information.

Optionally, a reference second record level of the user is also carried in the record information acquisition request.

The first result processing module 712 is further used for:

adjusting a second record level in matched second record information by using the reference second record level after the second record information is matched and before the matched second record information is sent to the information server.

Optionally, the first result processing module 712 is further used for:

sending changed second record level of the user to the information server if the second record level in the second record information about the user is changed.

Figure 8:
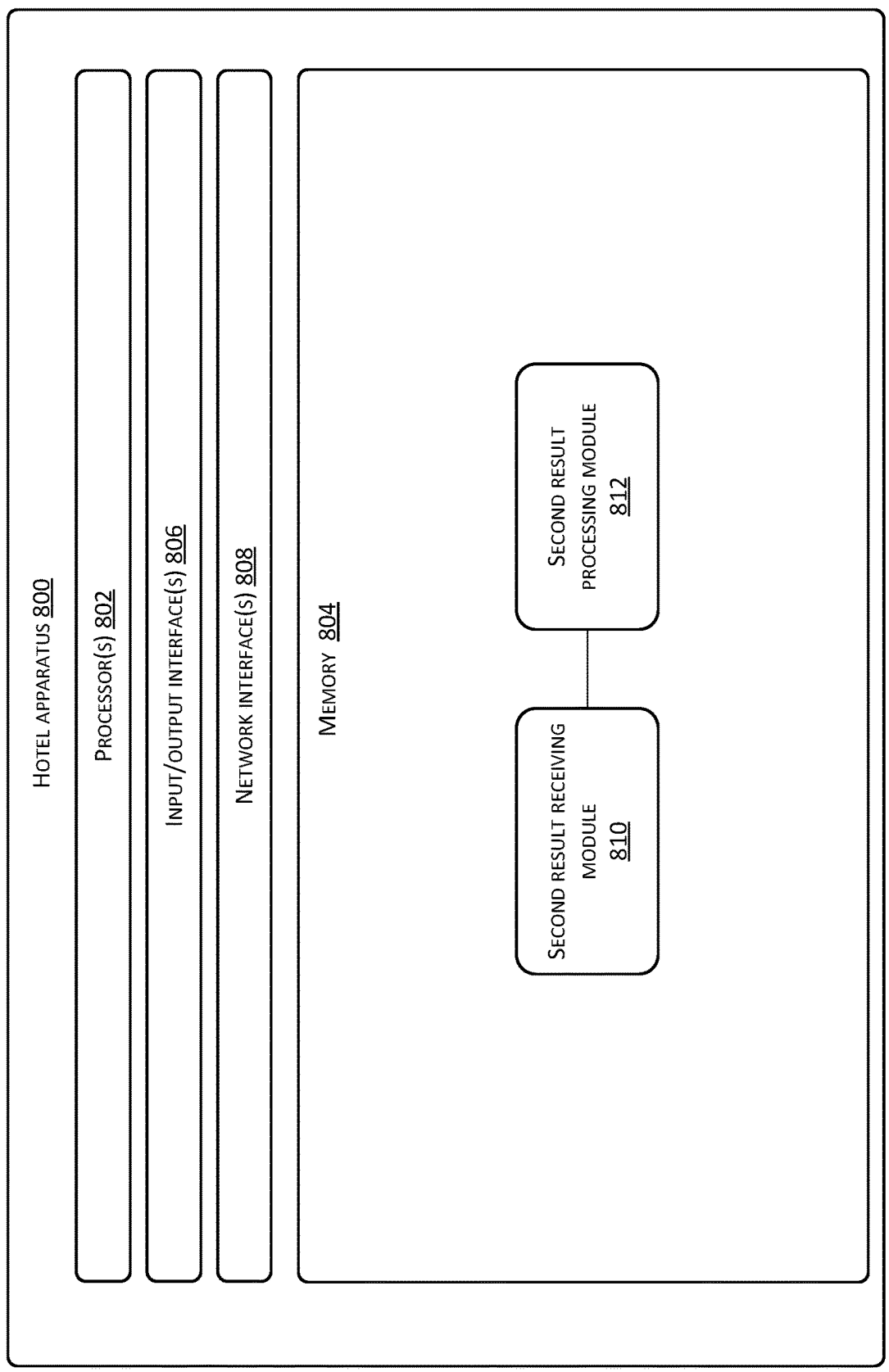
FIG. 8 is a schematic structural diagram of hotel apparatus according to an example embodiment of the present disclosure.

As shown in FIG. 8, a hotel apparatus 800 of an example embodiment of the present disclosure is applied to a service implementation system including an information server and a hotel apparatus, wherein the hotel apparatus provides service data information to the information server.

As shown in FIG. 8, the hotel apparatus 800 may include one or more processor(s) 802 or data processing unit(s) and memory 804. The service apparatus 800 may further include one or more input/output interface(s) 806 and one or more network interface(s) 808. The memory 804 is an example of computer readable medium or media.

The memory 804 may store therein a plurality of modules or units including:

a second result receiving module 810 for receiving a service data processing result sent by the information server, wherein the service data processing result is generated by the information server according to second record information about a user and service data information selected by the user from the service data information after receiving an order placing request from the user, the second record information about the user is determined by the information server according to first record information about the user, the first record information is record information about the user registered with the information server, and the second record information is second record information about the user registered with the hotel apparatus; and a second result processing module 812 for processing the received service data processing result.

A person skilled in the art should understand that the example embodiments of the present disclosure may be provided as a method, a device (apparatus) or a computer program product. Therefore, the present disclosure may use a form of a complete hardware example embodiment, a complete software example embodiment or an example embodiment combining software and hardware. Moreover, the present disclosure may use a form of a computer program product that is implemented on one or more computer-usable storage media (including but not limited to a disk memory, a CD-ROM, an optical memory or the like) that include computer-usable program code.

The present disclosure is described with reference to the flowcharts and/or block diagrams of the method, the device (apparatus), and the computer program product according to the example embodiments of the present disclosure. It should be understood that computer-readable instructions may be used to implement each procedure and/or each block in the flowcharts and/or the block diagrams and a combination of a procedure and/or a block in the flowcharts and/or the block diagrams. These computer-readable instructions may be provided to a general-purpose computer, a dedicated computer, an embedded processor or a processor of any other programmable data processing apparatus to produce a machine, so that the instructions executed by a computer or a processor of any other programmable data processing apparatus produce a device for implementing a specific function in one or more procedures in the flowcharts and/or in one or more blocks in the block diagrams.

These computer-readable instructions may also be stored in a computer-readable memory that may instruct the computer or any other programmable data processing apparatus to work in a specific manner, so that the instructions stored in the computer-readable memory produce manufactured products including an instruction device. The instruction device implements a specific function in one or more procedures in the flowcharts and/or in one or more blocks in the block diagrams.

These computer-readable instructions may also be loaded onto a computer or any other programmable data processing apparatus, so that a series of operations and steps are performed on the computer or any other programmable apparatus, so as to generate computer-implemented processing. Therefore, the instructions executed on the computer or any other programmable apparatus provide steps for implementing a specific function in one or more processes in the flowcharts and/or in one or more blocks in the block diagrams.

Although the example embodiments of the present disclosure have been described, persons skilled in the art may make changes and modifications to these example embodiments once they learn the basic inventive concept. Therefore, the appended claims are intended to be construed as to cover the example embodiments and all changes and modifications falling within the scope of the present disclosure.

Obviously, persons skilled in the art may make various modifications and variations to the present disclosure without departing from the spirit and scope of the present disclosure. In this way, the present disclosure is also intended to cover these modifications and variations provided that these modifications and variations to the present disclosure fall within the scope of the claims of the present disclosure and their equivalent technology.

The present disclosure may further be understood with clauses as follows.

Clause 1. A service data processing method applied to a service implementation system comprising an information server and a plurality of service apparatuses, wherein the service apparatuses provide service data information to the information server, the method comprising:

the information server receiving a service request sent by a user terminal, wherein service data information selected by a user using the user terminal from the service data information is carried in the service request;

determining, according to first record information about the user, second record information about the user registered with a service apparatus providing the selected service data information, wherein the first record information about the user is record information about the user registered with the information server; and performing service data processing by using the determined second record information about the user and the selected service data information.

Clause 2. The method of clause 1, wherein the determining, according to the first record information about the user, the second record information about the user registered with the service apparatus providing the selected service data information comprises:

searching for the second record information corresponding to the first record information about the user from a set of binding relationships between first record information and second record information previously established by the service apparatus providing the selected service data information; and using the found second record information as the second record information about the user registered with the service apparatus providing the selected service data information if corresponding second record information is found.

Clause 3. The method of clause 2, further comprising:

determining user information about the user if no corresponding second record information is found;

acquiring, by using the user information, second record information about the user from the service apparatus providing the selected service data information; and using acquired second record information as the second record information if the second record information is acquired.

Clause 4. The method of clause 3, further comprising:

establishing a binding relationship between the first record information about the user and the acquired second record information after the second record information is acquired; and updating the set of binding relationships by using the established binding relationship between the first record information and the acquired second record information.

Clause 5. The method of clause 1, further comprising:

determining public record information in the service apparatus providing the selected service data information if second record information about the user registered with the service apparatus providing the selected service data information is not determined according to the first record information about the user; and performing service data processing by using the determined public record information and the selected service data information.

Clause 6. The method of clause 5, wherein after the second record information about the user registered with the service apparatus providing the selected service data information is not determined, the method further comprises:

determining user information about the user;

acquiring, by using the determined user information, second record information about the user from the service apparatus providing the selected service data information; and establishing a binding relationship between first record information about the user and acquired second record information if the second record information is acquired.

Clause 7. The method of clause 1, wherein:

the information server pre-establishes a set of binding relationships between first record information and second record information for each service apparatus; and before the information server receives the service request sent by the user terminal, the method further comprises:

receiving a page access request sent by the user terminal;

determining a second record level in bound second record information if, by using the pre-established set of binding relationships, first record information about a user using the user terminal is determined to be bound with second record information;

determining service data information corresponding to the second record level in the bound second record information; and responding to the page access request based on the corresponding service data information.

Clause 8. The method of clause 7, wherein after the receiving the page access request sent by the user terminal, the method further comprises:

searching for a second record level corresponding to a first record level in first record information about the user from a pre-established corresponding relationship between a first record level and a second record level in the service apparatus, if, by using the pre-established set of binding relationships, the first record information about the user using the user terminal is determined not to be bound with second record information;

determining service data information corresponding to the found second record level; and responding to the page access request based on the corresponding service data information.

Clause 9. The method of clause 7, further comprising:

if the second record level in the second record information about the user is determined to be changed, updating stored second record information about the user with the changed second record level.

Clause 10. The method of any one of clauses 1 to 9, further comprising:

sending a service data processing result to the service apparatus providing the selected service data information.

Clause 11. A service data processing method applied to a service implementation system comprising an information server and a hotel apparatus, wherein the hotel apparatus provides service data information to the information server, the method comprising:

the information server receiving an order placing request sent by a user terminal, wherein service data information selected by a user using the user terminal from the service data information is carried in the order placing request;

determining, according to first record information about the user, second record information about the user registered with a hotel apparatus providing the selected service data information, wherein the first record information about the user is record information about the user registered with the information server; and performing service data processing by using the determined second record information about the user and the selected service data information.

Clause 12. A service data processing method applied to a service implementation system comprising an information server and a plurality of service apparatuses, wherein the service apparatuses provide service data information to the information server, the method comprising:

a service apparatus receiving a service data processing result sent by the information server, wherein the service data processing result is generated by the information server according to second record information about a user and service data information selected by the user from the service data information, the second record information about the user is determined by the information server according to first record information about the user, the first record information is record information about the user registered with the information server, and the second record information is second record information about the user registered with the service apparatus; and processing the received service data processing result.

Clause 13. The method of clause 12, further comprising:

receiving a record information acquisition request sent by the information server, wherein user information about the user is carried in the record information acquisition request;

determining the second record information about the user by using the user information; and sending a record information acquisition response to the information server, wherein the determined second record information is carried in the record information acquisition response.

Clause 14. The method of clause 13, wherein the determining the second record information about the user by using the user information comprises:

matching stored second record information with the user information;

using matched second record information as the determined second record information if second record information is matched; and creating second record information for the user by using the user information if no second record information is matched, and using the created second record information as the determined second record information.

Clause 15. The method of clause 14, wherein:

a reference second record level of the user is carried in the record information acquisition request; and after the second record information is matched, before sending the matched second record information to the information server, the method further comprises:

adjusting a second record level in the matched second record information by using the reference second record level.

Clause 16. The method of clause 13, further comprising:

sending changed second record level of the user to the information server if the second record level in the second record information about the user is changed.

Clause 17. A service data processing method applied to a service implementation system comprising an information server and a hotel apparatus, wherein the hotel apparatus provides service data information to the information server, the method comprising:

the hotel apparatus receiving a service data processing result sent by the information server, wherein the service data processing result is generated by the information server according to second record information about a user and service data information selected by the user from the service data information after receiving an order placing request from the user, the second record information about the user is determined by the information server according to first record information about the user, the first record information is record information about the user registered with the information server, and the second record information is second record information about the user registered with the hotel apparatus; and processing the received service data processing result.

Clause 18. An information server for service data processing applied to a service implementation system comprising the information server and a plurality of service apparatuses, wherein the service apparatuses provide service data information to the information server, the information server comprising:

a first receiving module for receiving a service request sent by a user terminal, wherein service data information selected from the service data information by a user using the user terminal is carried in the service request;

a first information determination module for determining, according to first record information about the user, second record information about the user registered with a service apparatus providing the selected service data information, wherein the first record information about the user is record information about the user registered with the information server; and a first service processing module for performing service data processing by using the determined second record information about the user and the selected service data information.

Clause 19. The information server of clause 18, wherein the first information determination module is specifically used for:

searching for second record information corresponding to first record information about the user from a set of binding relationships between first record information and second record information previously established by the service apparatus providing the selected service data information; and using found second record information as the second record information about the user registered with the service apparatus providing the selected service data information if corresponding second record information is found.

Clause 20. The information server of clause 19, wherein the first information determination module is further used for:

determining user information about the user if no corresponding second record information is found;

acquiring, by using the user information, second record information about the user from the service apparatus providing the selected service data information; and using acquired second record information as the second record information if the second record information is acquired.

Clause 21. The information server of clause 20, wherein the first information determination module is further used for:

establishing a binding relationship between the first record information about the user and the acquired second record information after the second record information is acquired; and updating the set of binding relationships by using the established binding relationship between the first record information and the acquired second record information.

Clause 22. The information server of clause 18, wherein:

the first information determination module is further used for:

determining public record information in the service apparatus providing the selected service data information if second record information about the user registered with the service apparatus providing the selected service data information is not determined according to the first record information about the user; and the first service processing module is further used for:

performing service data processing by using the determined public record information and the selected service data information.

Clause 23. The information server of clause 22, wherein the first information determination module is further used for:

determining user information about the user after second record information about the user registered with the service apparatus providing the selected service data information is not determined;

acquiring, by using the determined user information, second record information about the user from the service apparatus providing the selected service data information; and establishing a binding relationship between first record information about the user and acquired second record information if the second record information is acquired.

Clause 24. The information server of clause 18, wherein:

the information server pre-establishes a set of binding relationships between first record information and second record information for each service apparatus; and the first information determination module is further used for:

receiving a page access request sent by a user terminal before the information server receives a service request sent by the user terminal;

determining a second record level in bound second record information if it is determined, by using the pre-established set of binding relationships, that first record information about a user using the user terminal is bound with second record information;

determining service data information corresponding to the second record level in the bound second record information; and responding to the page access request based on the corresponding service data information.

Clause 25. The information server of clause 24, wherein the first information determination module is further used for:

searching for a second record level corresponding to a first record level in first record information about the user from a pre-established corresponding relationship between a first record level and a second record level in the service apparatus, if, by using the pre-established set of binding relationships, the first record information about the user using the user terminal is determined not to be bound with second record information, after the receiving the page access request sent by the user terminal;

determining service data information corresponding to the found second record level; and responding to the page access request based on the corresponding service data information.

Clause 26. The information server of clause 24, wherein the first information determination module is further used for:

if the second record level in the second record information about the user is determined to be changed, updating stored second record information about the user with the changed second record level.

Clause 27. The information server of any one of clauses 18 to 26, wherein the first service processing module is further used for:

sending a service data processing result to the service apparatus providing the selected service data information.

Clause 28. An information server for service data processing applied to a service implementation system comprising an information server and a hotel apparatus, wherein the hotel apparatus provides service data information to the information server, the information server comprising:

a second receiving module for receiving an order placing request sent by a user terminal, wherein service data information selected from the service data information by a user using the user terminal is carried in the order placing request;

a second information determination module for determining, according to first record information about the user, second record information about the user registered with a hotel apparatus providing the selected service data information, wherein the first record information about the user is record information about the user registered with the information server; and a second service processing module for performing service data processing by using the determined second record information about the user and the selected service data information.

Clause 29. A service apparatus for service data processing applied to a service implementation system comprising an information server and a plurality of service apparatuses, wherein the service apparatuses provide service data information to the information server, the service apparatus comprising:

a first result receiving module for receiving a service data processing result sent by the information server, wherein the service data processing result is generated by the information server according to second record information about a user and service data information selected by the user from the service data information, the second record information about the user is determined by the information server according to first record information about the user, the first record information is record information about the user registered with the information server, and the second record information is second record information about the user registered with the service apparatus; and a first result processing module for processing the received service data processing result.

Clause 30. The service apparatus of clause 29, wherein:
the first result receiving module is further used for:
receiving a record information acquisition request sent by the information server, wherein user information about the user is carried in the record information acquisition request; and the first result processing module is further used for:
determining second record information about the user by using the user information; and sending a record information acquisition response to the information server, wherein the determined second record information is carried in the record information acquisition response.

Clause 31. The service apparatus of clause 30, wherein the first result processing module is specifically used for:
matching stored second record information with the user information;
using matched second record information as the determined second record information if second record information is matched; and
creating second record information for the user by using the user information if no second record information is matched, and using the created second record information as the determined second record information.

Clause 32. The service apparatus of clause 31, wherein:
a reference second record level of the user is also carried in the record information acquisition request; and
the first result processing module is further used for:
adjusting a second record level in matched second record information by using the reference second record level after the second record information is matched and before the matched second record information is sent to the information server.

Clause 33. The service apparatus of clause 30, wherein the first result processing module is further used for:
sending changed second record level of the user to the information server if the second record level in the second record information about the user is changed.

Clause 34. A hotel apparatus for service data processing applied to a service implementation system comprising an information server and the hotel apparatus, wherein the hotel apparatus provides service data information to the information server, the hotel apparatus comprising:

a second result receiving module for receiving a service data processing result sent by the information server, wherein the service data processing result is generated by the information server according to second record information about a user and service data information selected by the user from the service data information after receiving an order placing request from the user, the second record information about the user is determined by the information server according to first record information about the user, the first record information is record information about the user registered with the information server, and the second record information is second record information about the user registered with the hotel apparatus; and a second result processing module for processing the received service data processing result.

What is claimed is:

1. A method comprising:
receiving, by an information server, a service request sent by a user terminal, the service request carrying service data information selected by a user using the user terminal from multiple service data information;
determining, by the information server, according to first record information about the user, second record information about the user, the second record information about the user being registered with a service apparatus providing the selected service data information, the first record information about the user being registered with the information server;
processing, by the information server, service data based on the second record information about the user and the selected service data information to generate a service data processing result; and
sending, by the information server, the service data processing result to the service apparatus.

2. The method of claim 1, wherein the determining, by the information server, according to the first record information about the user, the second record information about the user comprises:
finding the second record information about the user corresponding to the first record information about the user based on a set of binding relationships between the first record information about the user and the second record information about the user previously established by the service apparatus; and
updating the second record information about the user with found second record information in response to finding the second record information about the user corresponding to the first record information about the user.

3. The method of claim 1, wherein the determining, by the information server, according to the first record information about the user, the second record information about the user comprises:
determining that the second record information about the user corresponding to the first record information about the user is not found based on a set of binding relationships between the first record information about the user and the second record information about the user previously established by the service apparatus;
determining user information about the user in response to determining that the second record information about the user corresponding to the first record information about the user is not found;
acquiring, by using the user information about the user, the second record information about the user from the service apparatus; and
updating the second record information about the user with acquired second record information from the service apparatus.

4. The method of claim 3, further comprising:
establishing a binding relationship between the first record information about the user and the acquired second record information; and
updating the set of binding relationships by using the established binding relationship between the first record information about the user and the acquired second record information.

5. The method of claim 1, further comprising:
determining public record information in the service apparatus providing the selected service data information in response to that the second record information about the user is not determined according to the first record information about the user; and
processing, by the information server, service data to generate a service data processing result based on the public record information and the selected service data information.

6. The method of claim 5, wherein after the second record information about the user is not determined, the method further comprises:
determining user information about the user;
acquiring, by using the user information, the second record information about the user from the service apparatus providing the selected service data information; and
establishing a binding relationship between the first record information about the user and the acquired second record information.

7. The method of claim 1, wherein:
the information server pre-establishes a set of binding relationships between first record information about multiple users and second record information about multiple users for each service apparatus.

8. The method of claim 7, further comprising:
before receiving the service request sent by the user terminal,
receiving a page access request sent by the user terminal;
determining, by using the pre-established set of binding relationships, that the first record information about the user using the user terminal is bound with the second record information about the user;
determining a second record level in the bound second record information about the user;
determining service data information corresponding to the second record level; and
responding to the page access request based on the service data information corresponding to the second record level.

9. The method of claim 7, further comprising:
receiving a page access request sent by the user terminal;
determining, by using the pre-established set of binding relationships, that the first record information about the user using the user terminal is not bound with second record information about the user;
searching for a second record level corresponding to a first record level in the first record information about the user from a pre-established corresponding relationship between the first record level and the second record level in the service apparatus;
determining service data information corresponding to the second record level; and
responding to the page access request based on the service data information corresponding to the second record level.

10. The method of claim 9, further comprising:
determining that the second record level in the second record information about the user is changed; and
updating the second record information about the user with changed second record level.

11. One or more memories storing thereon computer-readable instructions that, when executed by one or more processors, cause the one or more processors to perform acts including:
receiving, by a service apparatus, a service data processing result sent by an information server, the service data processing result being generated by the information server according to second record information about a user and service data information selected by the user from service data information, the second record information about the user being determined by the information server according to first record information about the user, the first record information about the user being registered with the information server, and the second record information about the user being registered with the service apparatus; and
processing, by the service apparatus, the service data processing result.

12. The one or more memories of claim 11, wherein the acts further comprise:
receiving a record information acquisition request sent by the information server, wherein the record information acquisition request carries user information about the user;
determining the second record information about the user by using the user information about the user; and
sending a record information acquisition response to the information server, wherein the record information acquisition response carries determined second record information.

13. The one or more memories of claim 12, wherein the determining the second record information about the user by using the user information about the user comprises:
matching stored second record information with the user information about the user;
creating second record information for the user by using the user information about the user in response to determining that no second record information is matched; and
using created second record information as the determined second record information.

14. The one or more memories of claim 12, wherein the determining the second record information about the user by using the user information comprises:
matching stored second record information with the user information about the user;
using matched second record information as the determined second record information in response to determining that the second record information is matched.

15. The one or more memories of claim 14, wherein:
the record information acquisition request carries a reference second record level of the user; and
after the second record information is matched, before sending the matched second record information to the information server, the acts further comprise:
adjusting a second record level in the matched second record information by using the reference second record level.

16. The one or more memories of claim 15, wherein the acts further comprise:
determining that the second record level in the second record information about the user is changed; and sending changed second record level to the information server.

17. A system comprising:
one or more processors; and
one or more memories storing thereon computer-readable instructions that, when executed by one or more processors, cause the one or more processors to perform acts including:
receiving, by an information server, a service request sent by a user terminal, wherein the service request carries service data information selected by a user using the user terminal from multiple service data information;
determining, by the information server, according to first record information about the user, second record information about the user, the second record information about the user being registered with a service apparatus providing the selected service data information, the first record information about the user being registered with the information server; and
processing, by the information server, service data based on the second record information about the user and the selected service data information to generate a service data processing result; and
sending, by the information server, the service data processing result to the service apparatus.

18. The system of claim 17, wherein the determining, by the information server, according to the first record information about the user, the second record information about the user comprises:
finding the second record information about the user corresponding to the first record information about the user based on a set of binding relationships between the first record information about the user and the second record information about the user previously established by the service apparatus; and
updating the second record information about the user with found second record information in response to finding the second record information about the user corresponding to the first record information about the user.

19. The system of claim 17, wherein the determining, by the information server, according to the first record information about the user, the second record information about the user comprises:
determining that the second record information about the user corresponding to the first record information about the user is not found based on a set of binding relationships between the first record information about the user and the second record information about the user previously established by the service apparatus;
determining user information about the user in response to determining that the second record information about the user corresponding to the first record information about the user is not found; and
acquiring, by using the user information about the user, the second record information about the user from the service apparatus.

* * * * *